(12) United States Patent
Mathieu et al.

(10) Patent No.: US 7,668,283 B2
(45) Date of Patent: Feb. 23, 2010

(54) PRESSURISER FOR A PRESSURISED WATER NUCLEAR POWER STATION

(75) Inventors: Victor Mathieu, Paris (FR); Jean-Pierre Izard, Paris (FR)

(73) Assignee: Areva NP, Courbevoie (FR)

( * ) Notice: Subject to any disclaimer, the term of this patent is extended or adjusted under 35 U.S.C. 154(b) by 90 days.

(21) Appl. No.: 11/617,146

(22) Filed: Dec. 28, 2006

(65) Prior Publication Data

US 2007/0274429 A1    Nov. 29, 2007

(30) Foreign Application Priority Data

Dec. 29, 2005   (FR)   .................... 05 13466

(51) Int. Cl.
 *G21C 9/00*    (2006.01)
(52) U.S. Cl. ........................ 376/283; 376/282; 376/309; 376/298
(58) Field of Classification Search ................. 376/307, 376/298, 299, 283, 282
See application file for complete search history.

(56) References Cited

U.S. PATENT DOCUMENTS

| | | | |
|---|---|---|---|
| 3,312,595 A * | 4/1967 | Hackney | 376/307 |
| 4,840,096 A | 6/1989 | Martin et al. | |
| 5,094,801 A * | 3/1992 | Dixon et al. | 376/307 |
| 5,202,082 A * | 4/1993 | Brown et al. | 376/260 |
| 5,605,361 A * | 2/1997 | Sims | 285/206 |
| 5,659,591 A * | 8/1997 | Gelbe et al. | 376/298 |
| 6,195,406 B1 * | 2/2001 | Conrads et al. | 376/307 |

FOREIGN PATENT DOCUMENTS

| EP | 0 158 544 A | 10/1985 |
|---|---|---|
| EP | 0 440 353 A1 | 8/1991 |

OTHER PUBLICATIONS

Merriam-Wester's Collegiate Dictionary, Tenth Edition, p. 1342.*

* cited by examiner

*Primary Examiner*—Rick Palabrica
(74) *Attorney, Agent, or Firm*—Connolly Bove Lodge & Hutz LLP

(57) ABSTRACT

Pressurizer for a pressurized water nuclear power station, comprising
  an outer casing which delimits an inner space;
  a duct (11) which extends beneath the casing and which is capable of being tapped from the coolant system of the nuclear power station;
  a tap (18) which places the inner space of the casing in communication with the duct (11), this tap (18) being welded to the duct (11) by means of a weld seam (32);
  a sleeve (42) for protecting the weld seam (32), which sleeve is arranged inside the tap (18) and which has a lower peripheral edge (46) which is engaged in the duct (11), the sleeve (42) defining with the tap (18) and the duct (11) an annular space (74) which is capable of being filled with the primary liquid;
wherein the annular space (74) is open along at least a portion of the lower peripheral edge (46) of the sleeve (42) and opens inside the duct (11).

10 Claims, 3 Drawing Sheets

PRESSURISER FOR A PRESSURISED WATER NUCLEAR POWER STATION

TECHNICAL FIELD

The invention generally relates to pressurisers for pressurised water nuclear power stations.

More precisely, the invention relates to a pressuriser for a pressurised water nuclear power station, of the type comprising:

an outer casing which delimits an inner space;
a duct which extends beneath the casing and which is capable of being tapped from the coolant system of the nuclear power station;
a tap which places the inner space of the casing in communication with the duct, this tap being welded to the duct by means of a weld seam;
a sleeve for protecting the weld seam, which sleeve is arranged inside the tap and which has a lower peripheral edge which is engaged in the duct, the sleeve defining with the tap and the duct an annular space which is capable of being filled with the primary liquid.

BACKGROUND TO THE INVENTION

Radioactive particles may accumulate in the annular space, close to the weld seam. These particles create a high metering rate in the proximity of the base of the pressuriser, which complicates inspection and maintenance operations on the base of the pressuriser.

In this context, the object of the invention is to provide a pressuriser which can be more readily maintained.

SUMMARY OF THE INVENTION

To this end, the invention proposes a pressuriser of the above-mentioned type, wherein the annular space is open along at least a portion of the lower peripheral edge of the sleeve and thus opens inside the duct.

The pressuriser may also have one or more of the following features, taken individually or according to any technically possible combination:

the annular space is open along the entire lower peripheral edge of the sleeve;
the tap defines an inner channel which places the duct and the inner space of the casing in communication, the pressuriser comprising a crown which is rigidly fixed to the inner side of the casing around the inner channel, the sleeve having an upper end portion which is fixed to the crown;
the crown and/or the upper end portion of the sleeve comprise(s) circulation holes which place the annular space in communication with the inner space of the casing;
the passage cross-section of the circulation holes is calibrated in order to limit the flow rate of primary liquid through the annular space to a maximum predetermined value;
the total passage cross-section of the circulation holes is between 0.5% and 2% of the passage cross-section of the inner channel of the tap;
the annular space has, along the lower peripheral edge of the sleeve, a passage cross-section of between 2% and 10% of the passage cross-section of the inner channel of the tap;
the sleeve is mounted so as to be able to be removed on the crown;
the pressuriser comprises a strainer which covers the inner channel of the tap and which is mounted so as to be able to be removed on the crown;
the upper end portion of the sleeve is engaged between the strainer and the crown.

BRIEF DESCRIPTION OF THE DRAWINGS

Other features and advantages of the invention will be appreciated clearly from the description thereof which is given below by way of non-limiting example, with reference to the appended Figures in which.

DESCRIPTION OF PREFERRED EMBODIMENTS

Figure 1:
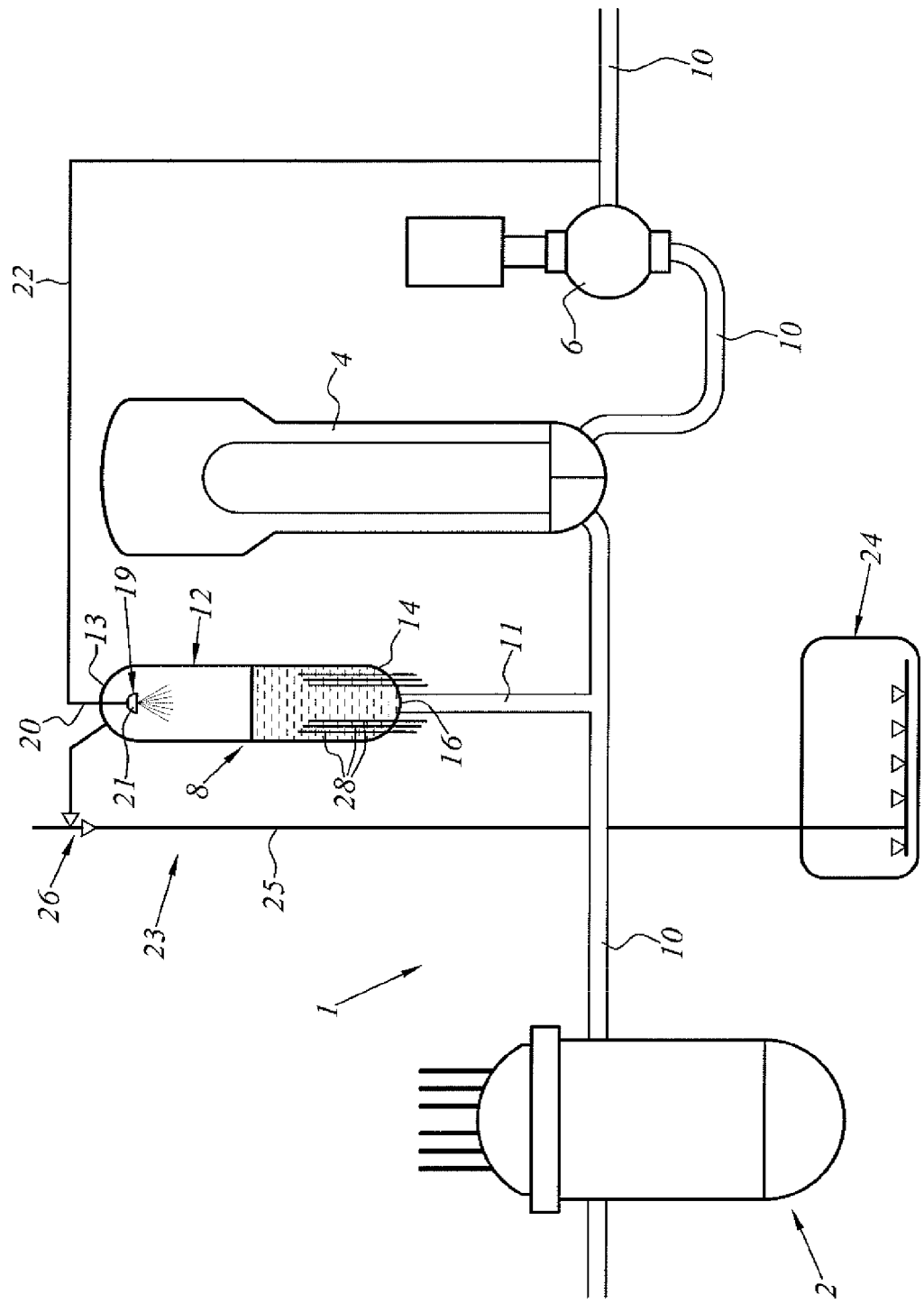
FIG. 1 is a simplified schematic illustration of the coolant system of a pressurised water nuclear reactor, comprising a pressuriser according to the invention.

FIG. 1 illustrates a primary coolant system 1 for a pressurised water nuclear reactor. This system 1 comprises a vessel 2 in which nuclear fuel assemblies are located, a steam generator 4 which is provided with primary and secondary portions, a primary pump 6 and a pressuriser 8. The vessel 2, the steam generator 4 and the pump 6 are connected by portions of primary pipe 10. The system 1 contains primary water, this water being delivered by the pump 6 towards the vessel 2, passing through the vessel 2 and being heated by means of contact with the fuel assemblies, then passing through the primary portion of the steam generator 4 before returning to the intake of the pump 6. The primary water heated in the vessel 2 transfers its heat in the steam generator 4 to secondary water which is passing through the secondary portion of this generator. The secondary water flows in a closed loop in a secondary system which is not illustrated. It evaporates whilst passing through the generator 4, the steam produced in this manner driving a steam turbine.

Figure 2:
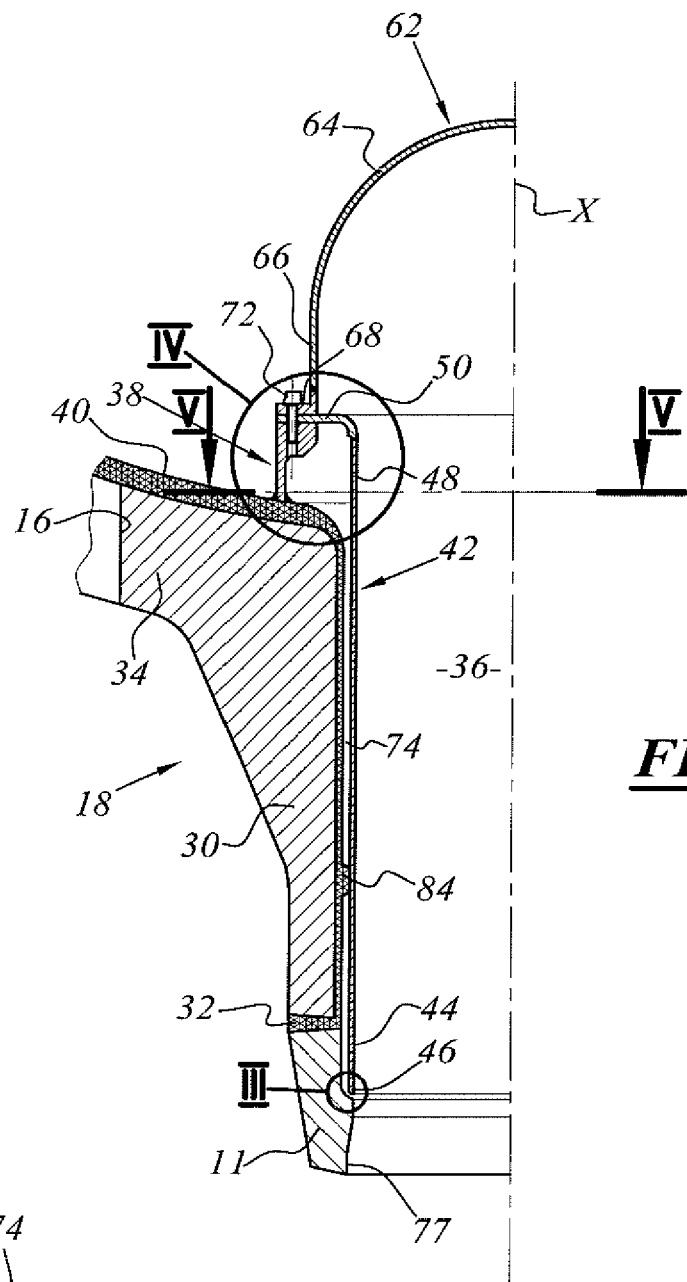
FIG. 2 is a partial axial section of the tap of the pressuriser of FIG. 1, further illustrating the protection sleeve which is arranged inside the tap.

The pressuriser 8 is mounted so as to branch off from the primary pipe via a duct 11 which is tapped from the portion 10 which connects the vessel 2 to the generator 4. It is arranged at a higher level than that of the pump 6 and the vessel 2. The pressuriser 8 comprises a fabricated outer casing 12 which is substantially cylindrical and has a vertical axis, and which is provided with a dome 13 and a lower base 14. The lower base 14 comprises a central hole 16 which is connected to the duct 11 by means of a tap 18 (FIG. 2).

The pressuriser 8 also comprises spraying means 19 which comprise a tap 20 which extends through the dome 13, a spray nozzle 21 which is arranged inside the casing 12 and which is mounted on the tap 20, a pipe 22 which connects the tap 20 to the primary pipe, in the region of the discharge of the pump 6, and means (not illustrated) for selectively authorising or preventing the flow of primary water in the pipe 22 as far as the nozzle 21.

The coolant system 1 also comprises a safety system 23 which comprises a relief tank 24, a pipe 25 which connects the tank 24 to the dome 13 of the pressuriser and a safety valve 26 which is interposed in the pipe 25 between the tank 24 and the pressuriser 8.

The inner space of the pressuriser 8 is in communication with the coolant system 1 by means of the tap 18 and the duct 11 so that the pressuriser 8 is permanently partially filled with the primary water, the level of water inside the pressuriser being in accordance with the current operating pressure of the coolant system. The roof of the pressuriser 8 is filled with the water vapour, at a pressure which is substantially equal to the pressure of the water flowing in the primary pipe 10 which connects the generator 4.

In the case of excess pressure in the pressuriser, the valve 26 opens and the water vapour is discharged as far as the tank 24 in which it condenses.

The pressuriser 8 is equipped with several tens of electrical heaters 28. These heaters are arranged vertically and are mounted on the lower base 14. They pass through the base 14 via holes which are provided for this purpose, sealing means being interposed between the heaters and the base 14.

The pressuriser 8 has the function of controlling the pressure of the water in the coolant system. Owing to the fact that it communicates with the primary pipe via the duct 11, it acts as an expansion vessel. In this manner, when the volume of water flowing in the coolant system increases or decreases, the level of water inside the pressuriser 8 will, depending on the circumstances, rise or fall.

This variation of the volume of water may result, for example, from an injection of water in the coolant system, or a variation of the operating temperature of the coolant system.

The pressuriser 8 also has the function of increasing or decreasing the operating pressure of the coolant system.

In order to increase the operating pressure of the coolant system, the heaters 28 are supplied with electrical power so that they heat the water which is contained in the lower portion of the pressuriser and bring it to its boiling temperature. A portion of this water boils so that the pressure in the roof of the pressuriser 8 increases. Owing to the fact that the vapour is constantly in a state of hydrostatic equilibrium with the water which circulates in the coolant system 1, the operating pressure of this coolant system 1 increases.

In order to reduce the operating pressure of the coolant system 1, the spray nozzle 21 is operated which is arranged in the roof of the pressuriser 8 by authorising the flow of water in the pipe 22 using means which are provided to this end. The water which is taken in the primary pipe 10 by the lift of the pump 6 is projected into the top of the pressuriser 8 and brings about the condensation of a portion of the water vapour which is located there. The pressure of the water vapour in the roof of the pressuriser 8 reduces so that the operating pressure of the coolant system 1 is also reduced.

As can be seen in FIG. 2, the tap 18 places the inner space of the casing 12 of the pressuriser in communication with the duct 11. The tap 18 comprises a portion 30 which is generally cylindrical with a vertical axis, and which has a lower end which is rigidly fixed to the duct 11 by means of a weld seam 32. The cylindrical portion 30 extends upwards via a portion 34 which forms a collar and which is welded to the edges of the opening 16. The substantially cylindrical portion 30 of the tap delimits an inner channel 36 which has a vertical axis and which connects the inner space of the casing 12 to the duct 11.

The tap 18 is a component which is forged from ferritic steel. The duct 11 is produced from austenitic steel.

The pressuriser also comprises a cylindrical crown 38 which has an axis X and which surrounds the inner channel 36 of the tap. The crown 38 is arranged inside the casing 12 and is welded to the face 40 of the collar 34 which is directed towards the inner side of the casing 12. This face 40 has an annular form and surrounds the inner channel 36.

The pressuriser further comprises a sleeve 42 for protecting the weld seam 32. The sleeve 42 is of a generally cylindrical form having a centre axis X, and is arranged in the inner channel 36 of the sleeve. It comprises a lower end portion 44 which is engaged in the duct 11 and which has a free lower peripheral edge 46. It also comprises an upper end portion 48 which extends in the inner space of the casing 12. The portion 48 extends radially outwards via a collar 50 which is rigidly fixed to the crown 38.

Figure 4:
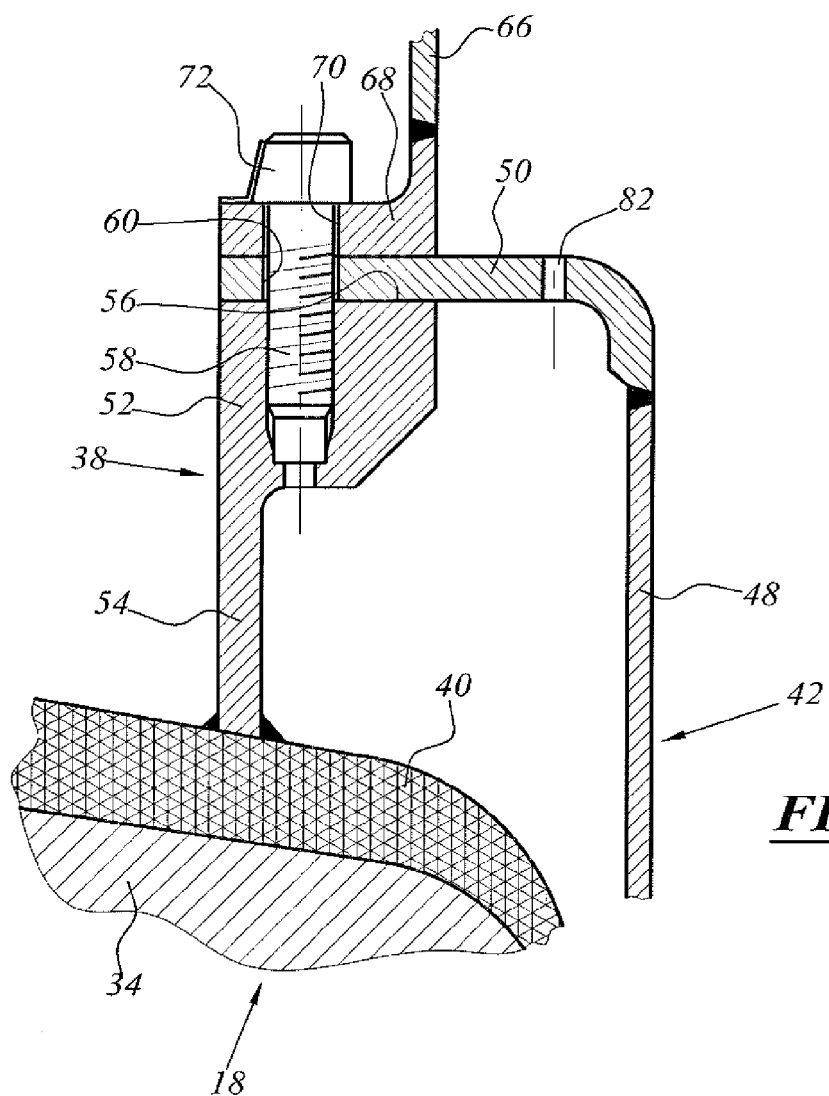

As shown in FIG. 4, the crown 38 has an upper portion 52 which radially has a substantial thickness, and a lower portion 54 which has a reduced thickness and which is welded to the face 40. The portion 52 is delimited upwards by a unit 56 which is perforated, for example, by twenty threaded holes 58 having vertical axes. The holes 58 are regularly distributed about the axis X. The collar 50 of the sleeve rests on the face 56 and has holes 60 which are arranged so as to be coincident with the holes 58.

Furthermore, the pressuriser also comprises a strainer 62 which is arranged inside the casing 12 and which covers the inner channel 36 of the tap. The strainer 62 comprises a hemispherical portion 64, which is perforated by filtration holes which are distributed over the entire surface thereof, and which is extended by a cylindrical portion 66 which is fixed to the crown 38 by means of a collar 68. As illustrated in FIG. 4, the collar 50 of the sleeve is engaged between the collar 68 of the strainer and the face 56 of the crown.

The collar 68 is perforated by holes 70 which are arranged so as to be coincident with the threaded holes 58. Screws 72 extend through the holes 70 and 60 and are screwed into the holes 58. They fix both the strainer 62 and the sleeve 42 to the crown 38.

The strainer 62 secures elements which may be carried in the coolant system by the primary liquid. It also acts as a diffuser and breaks the vortexes which are capable of being formed in the flow of primary liquid entering or leaving the pressuriser.

The sleeve 42 defines with the cylindrical portion 30 of the tap and with the duct 11 an annular space 74 having an axis X.

Figure 3:
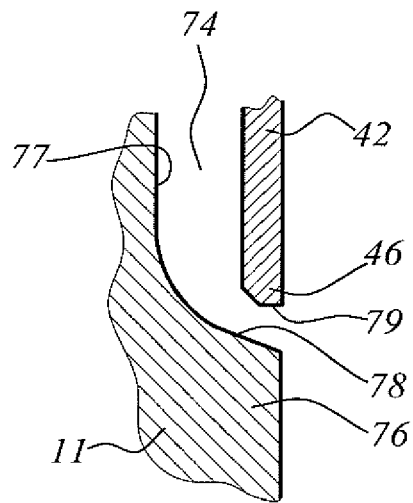
FIGS. 3 and 4 are enlarged views of details III and IV of FIG. 2.

As shown in FIG. 3, the annular space 74 is open downwards along the entire lower peripheral edge 46.

As shown in FIGS. 2 and 3, a peripheral shoulder 76 is formed on the inner face 77 of the duct 11, in the region of the lower peripheral edge 46 of the sleeve. The shoulder 76 is delimited upwards by a face 78 which extends below the edge 46 and which defines therewith an inner hole 79 of the annular space 74.

The face 78 is slightly inclined downwards and is connected upwards to the inner face 77 of the duct 11 by a curved surface.

Figure 5:
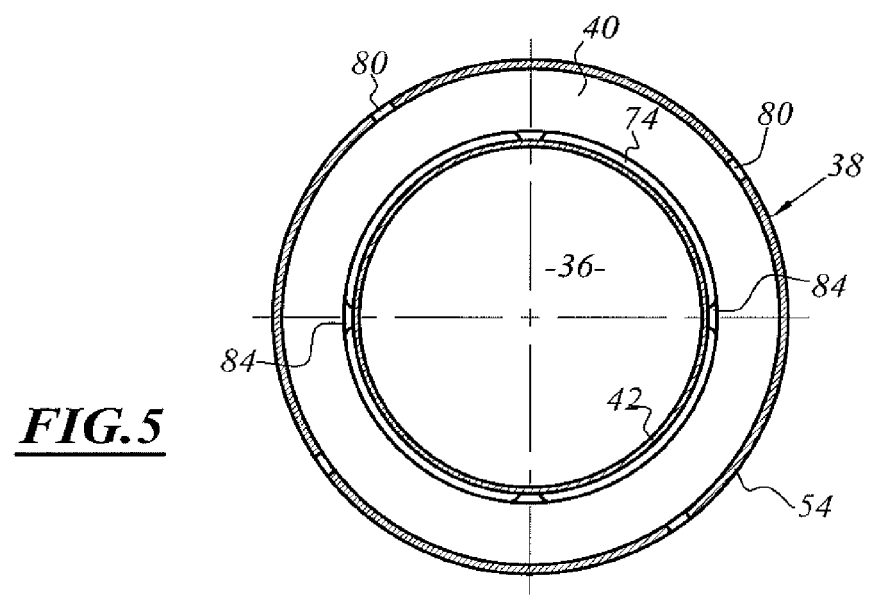
FIG. 5 is a sectioned view perpendicular relative to the axis of the sleeve, when viewed along the incidence of the arrows V of FIG. 2.

The lower portion 54 of the crown 38 is perforated by four holes 80 which place the annular space 74 in communication with the inner space of the casing 12 (FIG. 5). Furthermore, the collar 50 is perforated by eight holes 82 (FIG. 4) which place the annular space 74 in communication with the inner space of the casing 12. The holes 80 and 82 are distributed regularly about the axis X.

The holes 82 act as vents during the filling of the pressuriser.

The passage cross-section of the holes 80 is calibrated in order to limit the flow rate of primary liquid through the annular space 74 to a maximum predetermined value.

This value is selected on a case by case basis, in accordance with the operating temperature range of the nuclear reactor and the geometry of the pressuriser.

The passage cross-section of the lower hole 79 of the annular space is selected to be between 2% and 10% of the passage cross-section of the inner channel 36 of the sleeve. In a typical embodiment, the spacing between the face 78 and the edge 46 is approximately 5 mm and the passage cross-section is approximately 10000 mm². The passage cross-section of the annular space 74 is typically between 10% and 15% of the passage cross-section of the channel 36.

The cumulative passage cross-section of the holes 80 is preferably between 0.5% and 2% of the passage cross-section of the channel 36. In a typical embodiment, the total passage cross-section of the holes 80 is approximately 600 mm².

Finally, four anti-vibration pads 84 which are regularly distributed about the axis X, are welded to the inner surface of the tap 18 (FIGS. 2 and 5). Their height corresponds substantially to the radial thickness of the annular space 74 so that the sleeve 42 normally rests freely on the pads 84.

The pressuriser described above has a number of advantages.

Owing to the fact that the annular space 74 is open downwards, along at least a portion of the lower peripheral edge of the sleeve 42, and thus opens in the duct 11, the radioactive particles cannot accumulate in this annular space and are discharged in the duct 11.

Furthermore, the holes 80 which are provided in the crown 38 allow a flow of primary fluid to be created in the annular space 74. The radioactive particles which are capable of accumulating in the annular space are therefore carried by the primary liquid, which further reduces the likelihood of an accumulation of radioactive particles being produced between the sleeve and the tap or the duct.

Furthermore, the lower portion of the annular space 74 is directed substantially radially towards the centre of the duct 11 and the transition between the axial portion and the radial portion of the annular space is carried out along a curve so as not to form blind angles in which the particles would be likely to accumulate.

Furthermore, the face 78 which delimits the radial portion of the annular space downwards is slightly inclined downwards relative to the horizontal which facilitates the carrying of the particles by the primary fluid flowing in the annular space.

The passage cross-sections of the holes 80 at the top of the sleeve are selected so as to create a predetermined localised pressure drop for the primary fluid which is passing through the annular space. The flow rate of primary fluid through the annular space is thus limited to a maximum predetermined value. The holes 80 could also be arranged in the collar 50 of the sleeve.

It should be noted that the primary fluid is capable of circulating in the annular space from the duct 11 to the inner side of the casing 12 (upwards) or in the opposite direction from the inner side of the casing 12 towards the duct 11 (downwards). The geometry of the holes 80 and the lower hole 79 allows a pressure drop to be created in the two flow directions of the fluid and therefore allows the flow rate to be limited in the two possible flow directions.

The fact that the lower portion of the annular space 74 is directed in a substantially radial manner contributes to limiting the flow rate of primary liquid in the annular space 74 when this liquid circulates from the primary pipe to the pressuriser. This orientation also makes it more difficult for radioactive particles carried by the primary fluid to penetrate from below into the annular space.

The limitation of the flow rate of primary fluid in the annular space 74 allows the speed of the temperature variations in the region of the weld seam 32 to be limited. This is significant since the weld seam is interposed between two components (tap 18 and duct 11) which are produced from different materials and which have different coefficients of thermal expansion. The impact of the thermal and mechanical stresses in the region of the weld seam and in the entire tap 18 is therefore greatly limited as a result.

Finally, the presence of the crown 38 for fixing the sleeve 42 is advantageous for mounting the strainer 62 on this crown.

The strainer 62 and the sleeve 42 can be readily disassembled. The screws 72 which are readily accessible are first removed. The strainer 62 is then removed, then the sleeve 42 is extracted upwards from the tap 30.

In a variant, it is possible to select the passage cross-section of the lower hole 79 so as to create a localised pressure drop to complement that created by the holes 80.

It is possible that the lower hole 79 extends over the entire periphery of the lower peripheral edge 46, or over only a portion thereof. The hole 79 may be continuous or may be divided into a plurality of openings which are separated from each other.

The invention claimed is:

1. Pressuriser for a pressurised water nuclear power station, comprising
    an outer casing which delimits an inner space;
    a duct which is located away from the casing and extends beneath the casing;
    a tap which places the inner space of the casing in communication with the duct, this tap having a lower end being welded to the duct by means of a weld seam and an upper end which opens into the inner space;
    a weld protecting sleeve arranged inside the tap and which has a lower peripheral edge which is engaged in the duct, an annular space selectively filled with a primary liquid being defined radially between the sleeve and the tap and the duct, the sleeve bounding the annular space on the inside, the tap and the duct bounding the annular space on the outside;
    wherein the duct has inside the lower peripheral edge of the sleeve an inner volume; and
    wherein the annular space has at least one opening along at least a portion of the lower peripheral edge of the sleeve and is in fluidic communication through the at least one opening with the inner volume of the duct.

2. Pressuriser according to claim 1, wherein the annular space is open along the entire lower peripheral edge of the sleeve.

3. Pressuriser according to claim 1, wherein the tap defines an inner channel which places the duct and the inner space of the casing in communication, the pressuriser comprising a crown which is rigidly fixed to an inner side of the casing around the inner channel, the sleeve having an upper end portion which is fixed to the crown.

4. Pressuriser according to claim 3, wherein the crown and/or the upper end portion of the sleeve comprise(s) circulation holes which place the annular space in communication with the inner space of the casing.

5. Pressuriser according to claim 4, wherein a passage cross-section of the circulation holes is calibrated in order to limit a flow rate of primary liquid through the annular space to a maximum predetermined value.

6. Pressuriser according to claim 5, wherein a total passage cross-section of the circulation holes is between 0.5% and 2% of the passage cross-section of the inner channel of the tap.

7. Pressuriser according to claim 3, wherein the annular space has, along the lower peripheral edge of the sleeve, a passage cross-section of between 2% and 10% of the passage cross-section of the inner channel of the tap.

8. Pressuriser according to claim 3, wherein the sleeve is removably mounted on the crown.

9. Pressuriser according to claim 3, wherein it comprises a strainer which covers the inner channel of the tap and which is removably mounted on the crown.

10. Pressuriser according to claim 9, wherein the upper end portion of the sleeve is engaged between the strainer and the crown.

\* \* \* \* \*